US012718801B1

(12) United States Patent
Knights et al.

(10) Patent No.: US 12,718,801 B1
(45) Date of Patent: Aug. 25, 2026

(54) SYSTEMS AND METHODS FOR ASSESSING SPEECH DATA

(71) Applicant: SonderMind Inc., Denver, CO (US)

(72) Inventors: Jonathan Knights, Lawrence Township, NJ (US); Hanjie Shen, Issaquah, WA (US); Benjamin Taylor, Brooklyn, NY (US); Virginia Quandt, Chapel Hill, NC (US)

(73) Assignee: SonderMind Inc., Denver, CO (US)

( * ) Notice: Subject to any disclaimer, the term of this patent is extended or adjusted under 35 U.S.C. 154(b) by 0 days.

(21) Appl. No.: 19/018,638

(22) Filed: Jan. 13, 2025

(51) Int. Cl.
*G10L 15/16* (2006.01)
*G10L 15/22* (2006.01)

(52) U.S. Cl.
CPC .............. *G10L 15/16* (2013.01); *G10L 15/22* (2013.01); *G10L 2015/225* (2013.01)

(58) Field of Classification Search
None
See application file for complete search history.

(56) References Cited

U.S. PATENT DOCUMENTS 7,299,405 B1 * 11/2007 Lee ........................ G06Q 10/10 709/204
11,120,226 B1 * 9/2021 Nudd ..................... G16H 40/67
11,631,401 B1 * 4/2023 Nudd ..................... G16H 80/00 704/9
2015/0286627 A1 * 10/2015 Chang .................. G06F 40/205 704/9
2016/0275046 A1 * 9/2016 Zheng ................... G06F 40/103
2019/0394511 A1 * 12/2019 Kalaboukis ...... H04N 21/25891
2020/0013516 A1 * 1/2020 Ito .......................... G16H 50/30
2020/0065151 A1 * 2/2020 Ghosh ................... G06F 40/295
2020/0211571 A1 * 7/2020 Shoa ....................... G10L 17/22
2020/0227026 A1 * 7/2020 Rajagopal ............. G06F 16/244
2021/0004706 A1 * 1/2021 Riddle .................... G06F 40/30
2021/0076002 A1 * 3/2021 Peters .................... H04N 7/152
2021/0174221 A1 * 6/2021 Vijapur Gopinath Rao ................ G06N 20/00
2021/0192346 A1 * 6/2021 Taylor .................... G06N 3/084
2021/0383913 A1 * 12/2021 Tablan .................... G10L 15/26

(Continued)

OTHER PUBLICATIONS

"6 principles for building an AI well-being companion," Jun. 7, 2024, retrieved from the internet at https://medium.com/@jenny_32115/6-principles-for-building-an-ai-well-being-companion-3e9979f24e5e, 10 pages.

(Continued)

*Primary Examiner* — Jonathan C Kim
(74) *Attorney, Agent, or Firm* — COOLEY LLP

(57) ABSTRACT

A non-transitory, processor-readable medium stores instructions that, when executed by a processor, cause the processor to provide prompt data as input to a first machine learning model to produce a plurality of training phrases. The plurality of training phrases is provided as input to a second machine learning model to produce a plurality of embeddings. Each embedding from the plurality of embeddings is provided as input to a third machine learning model to identify a classification associated with that embedding, each classification being from a plurality of classifications that defines a sequence. The instructions further cause the processor to train a fourth machine learning model to predict, based on text data received from a user compute device, the classification from the plurality of classifications.

20 Claims, 6 Drawing Sheets

(56) References Cited

U.S. PATENT DOCUMENTS

| | | | | |
|---|---|---|---|---|
| 2022/0108697 | A1* | 4/2022 | Saeki | G10L 15/26 |
| 2022/0309250 | A1* | 9/2022 | Das | G06F 40/284 |
| 2022/0398598 | A1* | 12/2022 | Das | G06N 5/01 |
| 2023/0085195 | A1* | 3/2023 | Karri | G06F 16/9535 706/12 |
| 2023/0237276 | A1* | 7/2023 | Lima | G06F 40/289 704/9 |
| 2023/0351121 | A1* | 11/2023 | Hasan | G06F 16/355 |
| 2024/0404514 | A1* | 12/2024 | Rollwage | G10L 15/183 |
| 2025/0022573 | A1* | 1/2025 | Darcy | G06F 40/30 |
| 2025/0265347 | A1* | 8/2025 | Gasser | G06F 21/577 |

OTHER PUBLICATIONS

Boswell, J.F. et al. "Readiness to change as a moderator of outcome in transdiagnostic treatment," Psychother Res., Sep. 2012, 22(5):570-578 (14 pages total).

Gollan, J.K. et al. "The Negativity Bias Predicts Response Rate to Behavioral Activation for Depression," J. Behav. Ther. Exp. Psychiatry, Sep. 2016, 52:171-178 (21 pages total).

Krampe, H. et al. "Readiness to change and therapy outcomes of an innovative psychotherapy program for surgical patients: results from a randomized controlled trial," BMC Psychiatry, Dec. 29, 2017, 17(417), 16 pages.

Lewis, C.C. et al. "The role of readiness to change in response to treatment of adolescent depression," J. Consult Clin. Psychol., Jun. 2009, 77(3):422-8 (16 pages total).

"Measurement-based care" American Psychological Association Services, Inc., Aug. 2022, retrieved from the internet at https://www.apaservices.org/practice/measurement-based-care, 10 pages.

Rodriguez, A. et al. "Impact of Locus of Control on Patient-Provider Communication: A Systematic Review," J Health Commun., Mar. 4, 2023, 28(3):190-204 (20 pages total).

Young, L.A., "Assess readiness to change for better therapy outcomes," retrieved from the internet at https://eatspeakthink.com/assess-readiness-to-change/ on Jan. 15, 2025, 20 pages.

* cited by examiner

SYSTEMS AND METHODS FOR ASSESSING SPEECH DATA

FIELD

One or more embodiments described herein relate to systems and computerized methods for analyzing text data and/or speech data to produce classification data associated with a plurality of hierarchies.

BACKGROUND

In some instances, an entity (e.g., a person) can have a state (e.g., readiness state) associated with a domain. In some instances, the entity can have (e.g., concurrently) a plurality of states (e.g., readiness states), where each state from the plurality of states is associated with a different domain from a plurality of domains. The plurality of states can include, for example, a sequence of states. The entity can benefit from an action (e.g., an intervention, an activity performed on and/or by the entity etc.); however, the efficacy of that action can be based on whether the state(s) of the entity exceed a threshold state. A need exists therefore, for systems and methods that are configured to determine a state(s) of an entity for a domain(s) and generate and or facilitate actions based on the state(s).

SUMMARY

According to an embodiment, a non-transitory, processor-readable medium stores instructions that, when executed by a processor, cause the processor to receive speech data from a user compute device, the speech data including text data. The text data is added to a context window that is associated with a machine learning model to produce a plurality of probability values associated with a plurality of predefined classifications, each predefined classification from the plurality of predefined classifications being associated with a plurality of domains. Based on the plurality of probability values, a first predefined classification is identified from the plurality of predefined classifications and a second predefined classification is identified from the plurality of predefined classifications, the first predefined classification being associated with a first domain from the plurality of domains, and the second predefined classification being associated with a second domain from the plurality of domains. The instructions further cause the processor to generate recommendation data based on at least one of the first predefined classification or the second predefined classification, and the recommendation data is sent to the user compute device.

According to an embodiment, a method includes receiving text data from a user compute device. The text data is provided as input to a natural language transformer model to produce a plurality of probability values associated with a plurality of predefined classifications, each predefined classification from the plurality of predefined classifications being associated with a plurality of domains. The method further includes identifying, based on the plurality of probability values, a first predefined classification from the plurality of predefined classifications and a second predefined classification from the plurality of predefined classifications, the first predefined classification being associated with a first domain from the plurality of domains, and the second predefined classification being associated with a second domain from the plurality of domains. Recommendation data is generated based on at least one of the first predefined classification or the second predefined classification, and the recommendation data is caused to be sent to the user compute device.

According to an embodiment, a non-transitory, processor-readable medium stores instructions that, when executed by a processor, cause the processor to provide prompt data as input to a first machine learning model to produce a plurality of training phrases. The plurality of training phrases is provided as input to a second machine learning model to produce a plurality of embeddings. The instructions further cause the processor to provide each embedding from the plurality of embeddings as input to a third machine learning model to identify a classification associated with that embedding, each classification being from a plurality of classifications that defines a sequence. A fourth machine learning model is trained to predict, based on text data received from a user compute device, the classification from the plurality of classifications.

DETAILED DESCRIPTION

Figure 1:
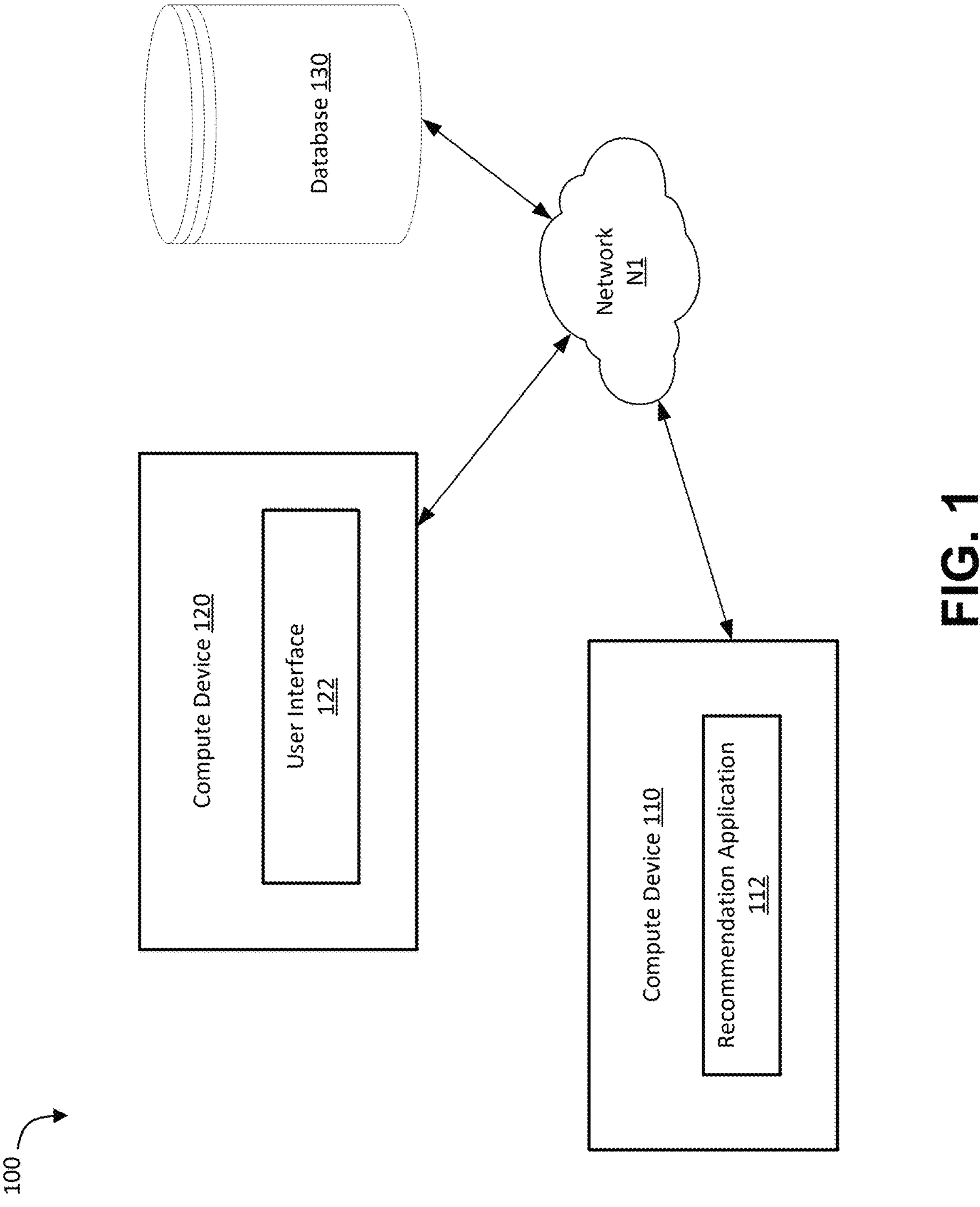
FIG. 1 shows a system block diagram of a recommendation system, according to an embodiment.

FIG. 1 shows a system block diagram of a recommendation system 100, according to an embodiment. The recommendation system 100 includes a compute device 110, a compute device 120, a database 130, and a network N1. The recommendation system 100 can include alternative configurations, and various steps and/or functions of the processes described below can be shared among the various devices of the recommendation system 100 or can be assigned to specific devices (e.g., the compute device 110, the compute device 120, and/or the like). For example, in some configurations, a user can provide inputs directly to the compute device 110 rather than via the compute device 120, as described herein.

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge (e.g., with respect to the network N1) node or other remote (e.g., with respect to the network N1) computing facility and/or device. In some implementations, each of the compute device 110 and/or the compute device 120 can be (or be included in) a data center or other control facility and/or device configured to run and/or execute a distributed computing system and can communicate with other compute devices.

The compute device 110 includes a recommendation application 112, which can include software (1) stored at a memory that is functionally and/or structurally similar to the memory 210 of FIG. 2 discussed below and (2) executed via a processor that is functionally and/or structurally similar to the processor 220 of FIG. 2 discussed below. The recommendation application 112 can be configured to identify, based on a distribution of probabilities, at least one classification associated with at least one domain, as described further herein. The recommendation application 112 can be implemented via software and/or hardware.

The compute device 120 can implement a user interface 122, which can include a graphical user interface (GUI) (e.g., displayed on a monitor/display) that is configured to receive input data (e.g., speech data, text data, trend data (e.g., that indicates a progression of a user's state), activity data, etc.) from a user. The user interface 122 can further cause display of output data generated by the recommendation application 112 (e.g., cause display of a visual indication of a progression of a user's state, a recommendation, an activity (e.g., a game), etc.). The user interface 122 can be implemented via software and/or hardware.

The database 130 can include at least one memory, repository and/or other form of data storage. The database 130 can be in communication with the compute device 110 and/or the compute device 120 (e.g., via the network N1, as described below). In some implementations, the database 130 can be housed and/or included in one or more of the compute device 110, the compute device 120, or a separate compute device(s). The database 130 can be configured to store, for example, input data (e.g., user data, trend data, etc.), historical action data (e.g., intervention history data), content data (e.g., to implement an action), etc., as described herein. Data stored at the database 130 can be retrieved or otherwise accessed by one or more compute devices, such as, the compute device 110, to perform at least some of the features (e.g., in relation to the recommendation application 112) described herein.

The database 130 can include a computer storage, such as, for example, a hard drive, memory card, solid-state memory, ROM, RAM, DVD, CD-ROM, write-capable memory, and/or read-only memory. In addition, the database 130 may include a distributed storage system where data is stored on a plurality of different storage devices, which may be physically located at a same or different geographic location (e.g., in a distributed computing system). In some implementations, the database 130 can be associated with cloud-based/remote storage.

The compute device 110 can be networked and/or communicatively coupled to the compute device 120 and/or the database 130, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the recommendation system 100 can include multiple compute devices 110 and/or compute devices 120. For example, in some implementations, the recommendation system 100 can include a plurality of compute devices 120, where each compute device 120 can be associated with a different user from a plurality of users. In some implementations, a plurality of compute devices 120 can be associated with a single user, where each compute device 120 can be associated with, for example, a different input modality (e.g., text input, audio input, video input, etc.). Some implementations can include various combinations of the above.

Figure 2:
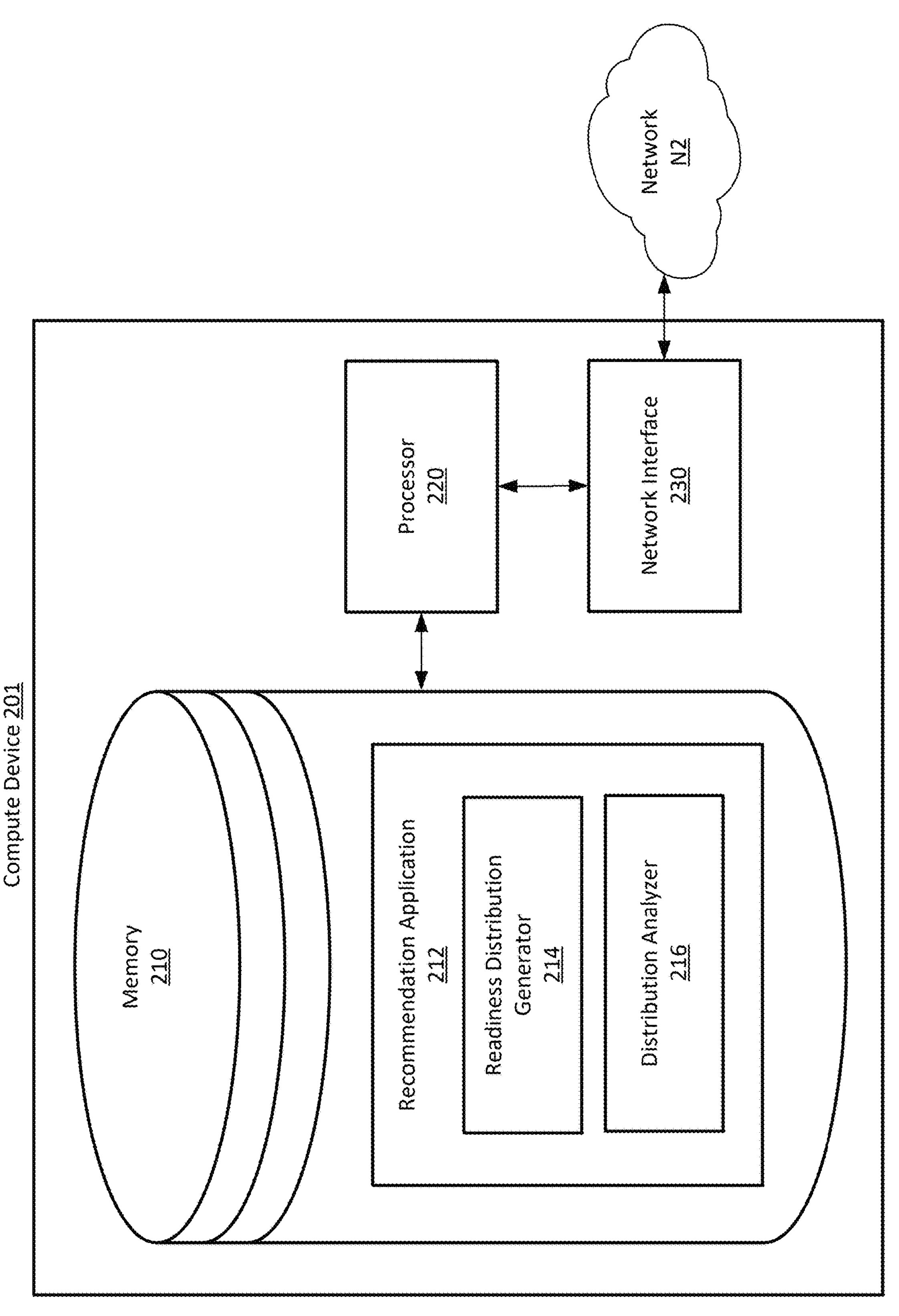
FIG. 2 shows a system block diagram of a compute device included in a recommendation system, according to an embodiment.

FIG. 2 shows a system block diagram of a compute device 201 included in a recommendation system, according to an embodiment. The compute device 201 can be structurally and/or functionally similar to, for example, the compute device 110 of the recommendation system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210. In some embodiments, for example, the processor 220 can be coupled to the memory 210 through a system bus (for example, address bus, data bus and/or control bus). In some implementations, the processor 220 can include a plurality of parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a recommendation application 212. The recommendation application 212 can be functionally and/or structurally similar to the recommendation application 112 of FIG. 1 and/or the recommendation application 312 of FIG. 3 (described herein).

Figure 3:
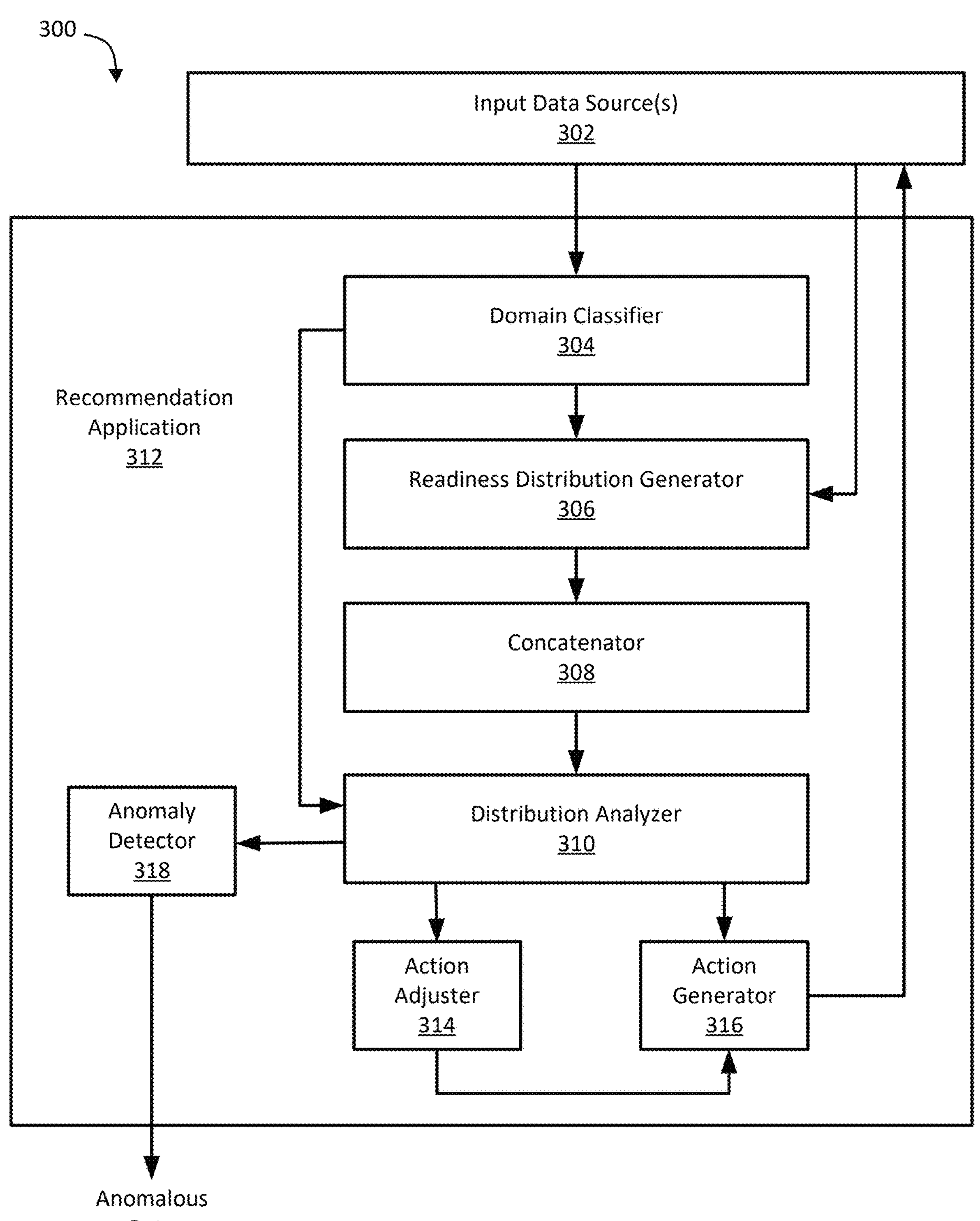
FIG. 3 shows a system block diagram of recommendation components included in and/or interfacing with a recommendation application, according to an embodiment.

The recommendation application 212 includes a readiness distribution generator 214, which can be functionally and/or structurally similar to the readiness distribution generator 306 of FIG. 3 (described further herein). The recommendation application 212 further includes a distribution analyzer 216, which can be functionally and/or structurally similar to the distribution analyzer 310 of FIG. 3 (described further herein).

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 122 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals.

FIG. 3 shows a system block diagram of recommendation components included in and/or interfacing with a recommendation application, according to an embodiment. The recommendation components 300 can be associated with a compute device (e.g., a compute device that is structurally and/or functionally similar to the compute device 201 of FIG. 2 and/or the compute devices 110 and 120 of FIG. 1). For example, the recommendation components 300 can be included in and/or associated with (1) the recommendation application 112 of FIG. 1 and/or (2) the recommendation application 212 of FIG. 2. In some instances, the recommendation components 300 can include software stored in memory 210 and configured to execute via the processor 220 of FIG. 2. In some instances, at least a portion of the recommendation components 300 can be implemented in hardware (e.g., an ASIC).

The recommendation components 300 include an input data source(s) 302 and a recommendation application 312 (e.g., that is functionally and/or structurally similar to the recommendation application 112 of FIG. 1 and/or the recommendation application 212 of FIG. 2). The recommendation application 312 includes a domain classifier 304, a readiness distribution generator 306 (e.g., that is functionally and/or structurally similar to the readiness distribution generator 214 of FIG. 2), a concatenator 308, a distribution analyzer 310 (e.g., that is functionally and/or structurally similar to the distribution analyzer 216 of FIG. 2), an action adjuster 314, an action generator 316, and an anomaly detector 318.

The input data source(s) 302 can include, a memory that stores data produced (e.g., expressed) by or otherwise associated with a user. For example, the memory can include a memory of a user compute device (e.g., that is functionally and/or structurally similar to the compute device 120 of FIG. 1), a database that stores user data associated with a plurality of users (e.g., a database that is functionally and/or structurally similar to the database 130 of FIG. 1), etc. In some instances, the input data source(s) 302 can include a third-party database (e.g., a records database, such as a clinical records database). The input data source(s) 302 can store speech data (e.g., audio data, text data transcribed from audio data, etc.), text data typed by a user via a keyboard, video and/or image data (e.g., that depicts a user), etc. In some instances, the input data source(s) 302 can store historical record data associated with the user (e.g., assessment data (e.g., self-assessment data, medical assessment data, psychological assessment data), observation data (e.g., notes taken by a specialist during an interaction with the user, etc.), data aggregated over time and/or over a plurality of interactions with the user, claim data, data produced from a study, and/or the like).

The input data source(s) 302 can store input data having at least one format. For example, the input data can include image data, video data, audio data, text data, etc. In some instances, the input data source(s) 302 can store data that indicates recommendations and/or actions previously generated by the action generator 316 (described further herein). The input data source(s) 302 can also store feedback data that is received in response to the recommendation and/or action being performed on and/or by the user, as described further herein. In some instances, the input data source(s) 302 can store external biometric data (e.g., sleep data, heart rate data, activity data, and/or similar data recorded via a wearable device and/or the like), electronic health record data, and/or the like.

The recommendation application 312 can receive input data from the input data source(s) 302 and predict (e.g., via the domain classifier 304, described further herein) a domain(s) associated with the input data. A domain can include, for example, a topic, an issue, and/or the like. The recommendation application 312 can further determine a readiness distribution(s) for the domain(s) (e.g., via the readiness distribution generator 306, described herein). Based on the readiness distribution(s), the recommendation application 312 can determine and/or implement an action(s) that addresses the domain(s). In some implementations, the recommendation application 312 can determine that the received input data is insufficient for determining a domain and/or readiness distribution. To augment the input data, the recommendation application 312 can facilitate a conversation with the user via a conversation agent (e.g., a large language model (LLM)), such that the recommendation application 312 can elicit further input data from the user. The conversation agent is described further below in relation to the domain classifier 304.

As described above, the domain classifier 304 can receive input data from the input data source(s) 302 and, in response, classify the input data to produce domain classification data. In some implementations, the domain classifier 304 can predict a domain(s) associated with the input data, and the domain classification data can indicate and/or represent the domain(s). To illustrate, in some instances, an example of a domain can include a symptom, a diagnosis, an affliction, a condition, and/or the like. In some instances, the input data can be associated with a plurality of domains. For example, the input data can indicate that the user is associated with both a first domain (e.g., the user has depression, as indicated by, for example, a statement made by the user and/or another source) and a second domain (e.g., the user has a substance abuse problem, as indicated by, for example, a medical professional assessment and/or another source). In some instances, the first domain and the second domain can be related to each other. For example, the first domain and the second domain can have a hierarchical relationship, where the first domain (e.g., depression) is caused by (e.g., is a symptom of) the second domain (e.g., substance abuse). The domain classifier 304 can be configured (e.g., trained) to identify a plurality of domains and relationships (e.g., hierarchical relationships) within the plurality of domains. Alternatively or in addition, the domain classifier 304 can be configured to identify, from the input data, a plurality of unrelated domains, such as a plurality of symptoms that are caused by different conditions.

The domain classifier 304 can include a machine learning model (e.g., a transformer-based model (such as a natural language transformer model, a sentence transformer model, etc.), a speech classification model, an image classification model (e.g., a concurrent neural network), and/or the like. For example, the domain classifier 304 can include an ensemble model configured to aggregate different types of input data. The ensemble model can include a plurality of machine learning models, where each machine learning model is configured to embed a different data format in a common latent space. As a result, embeddings produced by each machine learning model can be compared, aggregated, etc., to produce an output. In some implementations, the domain classifier 304 can be configured to identify a context (associated with a particular domain) within that phrase and parse the phrase to isolate that context from another context (associated with another domain). For instance, if a phrase is related to depression, anxiety, and/or the like, the domain classifier can identify (e.g., through natural language classification, regular expressions, etc.) the parts of the phrase related to each domain. Extracted phrase segments for each domain can be provided as independent inputs to the readiness distribution generator 306 (described herein) to produce readiness distributions for each domain.

In some implementations, the domain classifier 304 (and/or the readiness distribution generator 306, described below) can determine that the received input data is insufficient for determining a domain (and/or a readiness distribution, described below). For example, the domain classifier 304 can determine that the input data is insufficient based on a confidence value associated with the domain classification (and/or the readiness distribution) being below a predetermined threshold. In response, the domain classifier 304 can include an LLM (e.g., a conversation agent) that can generate questions that can be communicated to the user to elicit further input data. For example, the domain classifier 304 can generate the question, "what would you like to share today," to which the user can respond, "I am not ready for therapy," "I've been thinking about getting help for my anxiety," "I have been journaling every day," etc. The domain classifier 304, upon receiving the user response, can classify the user response as indicating at least one domain. In some implementations, the domain classifier 304 can include a context window, and input data received from the input data source(s) 302 can be added to the context window, such that the domain classifier 304 can generate domain classification data based on aggregated input data within the context window.

The context window can include a collection of data segments (referred to herein as tokens) stored in a memory (e.g., a memory structurally and/or functionally similar to the memory 210 of FIG. 2). The tokens can be used as context by the domain classifier 304 while interpreting the input data, generating the domain classification data, and/or generating questions to elicit further input data from the user. Tokens can be added to and/or removed from the collection of tokens (e.g., the context window) as an extended intervention (e.g., a care plan) progresses and/or as conversation between the user and the conversation agent progresses. In some instances, tokens associated with older data can be removed from the collection of tokens (e.g., the context window) in response to contemporaneous tokens being added to the collection of tokens (e.g., the context window). These contemporaneous tokens can be associated with more recent user assessments (e.g., data from a recent medical checkup), more recent actions (e.g., recent interventions performed on the user), more recent dialogue between the user and the conversation agent, etc. As a result, the domain classifier 304 can infer the semantic meaning (e.g., the domain) of the input data based on the more recent context (as opposed to the older context).

The readiness distribution generator 306 can receive input data from the input data source(s) 302 and domain classification data (e.g., an indication of a domain classification(s)) from the domain classifier 304. Although shown as separate components in FIG. 3, in some instances, a single component (e.g., a single model) can perform similar functions as those performed by the domain classifier 304 and the readiness distribution generator 306. In some implementations, the readiness distribution generator 306 can include a multi-layer perceptron (MLP) model that is configured to process domain classification data and text data (or speech data, audio data, image data, etc.). In some implementations, as described further herein, the readiness distribution generator 306 can receive (or generate during an intermediate step) embeddings for the input data from the input data source(s) 302 and for the classification data, such that the embeddings can be further processed to produce an output.

In response to receiving the input data and/or the classification data as input, the readiness distribution generator 306 can produce a plurality of probability values (e.g., a probability distribution). The plurality of probability values can include a probability value for each state from a plurality of states. The plurality of states can include a sequence of states, where each state has an order within the sequence of states. To illustrate, in some instances, the sequence of states can include a sequence of readiness states (e.g., readiness levels, readiness milestones, etc.), where each readiness state within the sequence of readiness states is ordered from least (or less) ready to most (or more) ready. In some instances, readiness can refer to a predicted willingness, enthusiasm, receptiveness, etc., for addressing (e.g., improving) an issue within the indicated domain (e.g., depression, substance abuse, etc.). For example, a first (e.g., initial) readiness state can include a precontemplation state, a second readiness state can include a contemplation state, a third readiness state can include a preparation state, and fourth readiness state can include an action state, and a fifth readiness state can include a maintenance state. The readiness distribution generator 306 can be configured to generate a probability value for each of the first, second, third, fourth, and fifth readiness states. These probability values can represent a probability (e.g., a confidence) that the user has the respective states.

In some instances, the readiness distribution generator 306 can be configured to generate a probability distribution for each domain identified within the classification data produced by the domain classifier 304. As a result, the readiness distribution generator 306 can indicate, for each domain (e.g., symptom, condition, etc.), a plurality of confidence values associated with a plurality of readiness levels. Alternatively or in addition, the readiness distribution generator 306 can determine a probability distribution for a plurality of domains. As a result, in some instances, the probability distribution can include a multimodal (e.g., a bimodal) distribution that indicates differing readiness levels for different domains.

For example, the probability distribution can include (1) a first elevated confidence value (e.g., that defines a first local peak) associated with a first readiness level (e.g., a lower readiness level, such as precontemplation) and (2) a second elevated confidence value (e.g., that defines a second local peak) associated a second readiness level (e.g., a higher readiness level that is different from the first readiness level). The first elevated confidence value can be further associated with a first domain, and the second elevated confidence value can be further associated with a second domain that is different form the first domain. The multimodal distribution can indicate that a user is more ready to address the second domain than the first domain. In some instances, the first domain and the second domain can define a hierarchical relationship, and the first domain can be higher in the hierarchy than the second domain. For example, the first domain can include a condition, and the second domain can include an effect (e.g., a symptom) caused by the condition. The multimodal distribution can, therefore, indicate that the user is more ready to address (e.g., work to improve) the second domain (e.g., a symptom) and less ready to address the first domain (e.g., an underlying cause of the symptom). More specifically, the probability distribution can indicate that a user is ready to acknowledge and address their depression but is in denial of (or is not ready to admit and/or address) a substance abuse problem that is a cause of (or a contributing factor to) the depression. As described further herein, the distribution analyzer 310 can be configured to analyze the probability distribution across a hierarchy of domains.

In some implementations, the readiness distribution generator 306 can receive intervention history data as input to produce the plurality of probability values. For example, the intervention history data can indicate that a user has previously addressed a domain, which can indicate that the user has a higher readiness level for further addressing that domain. In some instances, the intervention history data can be associated with an intervention that was not facilitated by the recommendation application 312. Alternatively or in addition, the intervention history data can be associated with an intervention that was facilitated by the recommendation application 312. For example, such an intervention can be facilitated by data produced via the distribution analyzer 310, as described further herein. In some implementations, the readiness distribution generator 306 can receive an indication of how long a user has been addressing a domain (e.g., a "time-in-program" metric), such that the readiness distribution generator 306 can determine readiness values based on the maturity of the user interaction. For example, a user can have increased readiness for a domain if that user has become aware of and/or working to improve that domain for a longer period of time.

To train the readiness distribution generator 306, a generative model (not shown in FIG. 3), such as an LLM, can be configured to iteratively generate synthetic data. The synthetic data can include, for example, sample phrases for each readiness state. For example, the LLM can be prompted with manually defined phrases for each readiness state, and the LLM can generate additional sample phrases for each readiness state. In some implementations, the LLM can continue to generate sample phrases until sufficient coverage has been achieved. For example, the LLM (or another model) can generate a uniqueness metric value for each sample phrase, and sufficient coverage can be achieved when a sufficient number of unique sample phrases and/or a sufficient spread of uniqueness metric values have been generated. In some instances, the LLM can produce a confidence value that indicates a confidence that a generated sample phrase is associated with a given readiness state. If a confidence level is below a threshold value, the generated phrase can be isolated and/or sent to a compute device for a manual review. By generating additional sample phrases for a given readiness level based on manually labelled data, the LLM can produce synthetic training data having pseudo-labels (e.g., that indicate the given readiness level), and can therefore facilitate weak-supervision learning.

The sample phrases (e.g., the synthetic training data, pseudo-labelled training data, etc.) can be provided as input to an embedder model (e.g., a natural language transformer) to produce an embedding for and representative of each sample phrase. The embeddings that represent the plurality of sample phrases can be used as training data to train an untrained readiness distribution generator. The readiness states used to prompt the LLM to generate the sample phrases can be used as ground truth data. Based on the training data and ground truth data, the untrained readiness distribution generator can be trained to predict the readiness state (or another classification) from input data and/or embeddings representing the input data. Training the untrained readiness distribution generator can produce the readiness distribution generator 306.

The concatenator 308 can concatenate the plurality of probability values associated with the plurality of states (e.g., readiness states) for a given domain, to produce concatenated data that represents a probability distribution. More specifically, the concatenator 308 can output a vector that includes as elements a probability value for each readiness state from the sequence of readiness states. In some instances, the concatenated data can represent a plurality of probability distributions, where each probability distribution is associated with a domain from a plurality of domains. Alternatively or in addition, a probability distribution can represent a readiness level(s) for a plurality of domains. The concatenated data can be provided as input to the distribution analyzer 310. In response, the distribution analyzer 310 can determine at least one action (e.g., a recommendation, an intervention, an activity, etc.) for one or more domains, based on the inputted concatenated data representing the probability distribution for the one or more domains.

The distribution analyzer 310 can be configured to combine probability distributions (e.g., observations) over time to analyze changes in data over that time (e.g., to determine whether observations are converging or mixed). Each observation can be from a multivariate distribution, and given these sequential observations, the distribution analyzer 310 can determine an evolving distribution based on individual phrase predictions, as described further below. More specifically, the distribution analyzer 310 can include a clustering model (e.g., a mixture model) that can identify clusters of readiness observations as new observations are received to determine an overall readiness level.

In some implementations, the distribution analyzer 310 can include a mixture model and/or any other probabilistic model configured to analyze distributions. For example, the distribution analyzer 310 can include a Dirichlet mixture model (DMM) configured to model ordinal data where each observation is a probability vector (e.g., having elements that sum to 1). The DMM can represent a mixture of Dirichlet distributions, where a Dirichlet distribution is a multivariate generalization of a Beta distribution. The distribution analyzer 310 can include an online algorithm to update the mixture model with new observations incrementally. This configuration can be useful for analyzing data that arrives sequentially, reducing or preventing retraining of a model when new data is received.

A new observation can include a probability distribution determined for a user input. Each observation can be considered a draw from an underlying (e.g., true, overall, etc.) readiness distribution that defines overall readiness values for each domain. The underlying distributional assumptions can enable identification of trends (e.g., "momentum") towards different phases of readiness versus isolated instances of readiness observations, etc. More specifically, the DMM framework can enable testing for modality (and/or multimodality) of the Dirichlet distribution as a result of iteratively fitting the DMM, using the online algorithm, to the outputs of the readiness (or other) probability outputs, and subsequently identifying movement between modalities.

The DMM can be initialized based on a prior distribution (e.g., based on a prior observation and/or a default distribution) and can have up to a threshold number of model components. When a new observation arrives and the number of components is less than the threshold number, a new component can be added to the model, initialized with the new observation. For each new generation, the algorithm can compute the responsibility (e.g., posterior probability) that each component has for representing the observation. This computation can include calculating the log-likelihood of the observation under each component and normalizing the results. Each component's parameters can be updated based on the new observation and associated responsibility. The Dirichlet parameters can be updated using Maximum Likelihood Estimation (MLE), adjusted by the responsibility. The weights of the mixture components can be updated and normalized to ensure they sum to 1, and the mean, variance, and covariance of the Dirichlet distributions for each component can then be computed. These moments are useful for understanding the distribution and for downstream tasks (e.g., recommendation generation, action generation, etc., as described herein). As a result, the DMM can dynamically monitor and aggregate across multiple observations over time (where each observation is classified individually) to identify an overall readiness level, multimodality, etc.

Alternatively or in addition, in some implementations, the distribution analyzer 310 can include a machine learning model (e.g., a neural network, an MLP, a recurrent neural network (RNN), a machine learning model that is configured to process sequential data, etc.). The machine learning model can be trained to designate, based on the probability distribution, a readiness state (e.g., level) for a domain (e.g., within a hierarchy, as described above). For example, based on the probability distribution having a local peak at a given readiness state, the machine learning model can designate that the user has that readiness state for the domain associated with the probability distribution. The machine learning model can be further trained to determine an action based on the at least one readiness state. More specifically, the distribution analyzer 310 can determine an action that is appropriate for the readiness state(s) indicated by the concatenated data. For example, the distribution analyzer 310 can identify a less intensive (e.g., less time intensive, less emotionally intensive, less effort intensive, etc.) intervention if the probability distribution indicates a lower level of readiness. Alternatively, the distribution analyzer 310 can identify a more intensive intervention if the probability distribution indicates a higher level of readiness.

In some implementations, the distribution analyzer 310 can include a reinforcement learning model (RLM) configured to determine an action based on a plurality of objectives for the user. For example, a first objective can include increased content engagement (e.g., to elicit enthusiasm from a user) and a second objective can include increased effectiveness (e.g., to impart knowledge on the user, to cause the user to alter the user's behavior, etc.). Alternatively or in addition, the distribution analyzer 310 can be configured to receive as input domain classification data from the domain classifier, such that the distribution analyzer 310 can prioritize a domain from a plurality of domains to address with a determined action and/or determine an action that at least partially addresses two or more domains from the plurality of domains. Alternatively or in addition, a user can define a priority order for domains, and the distribution analyzer 310 can receive the priority order as input to determine actions that address a domain before other domains based on the priority of the domain within the priority order.

An action determined by the distribution analyzer 310 can include, for example, a recommendation, the data for which can then be generated by the action generator 316, such that the recommendation can be communicated via a display and/or can be audibly conveyed to a user via a speaker. The action generator 316 can be configured to produce data (e.g., text data, audio data, image data, etc.) that implements the action/recommendation and/or instructs the user on how to implement the action/recommendation. In some implementations, an action can include providing the user with informational content that is appropriate given the user's readiness level. In some implementations, an action can be associated with a task and/or tool, such as a clinical tool, a cognitive game, a motivational interview, an activity associated with cognitive behavioral therapy (CBT), a periodic (e.g., daily, weekly, etc.) reflection journal prompt (e.g., a CBT reflection prompt), an n-back memory test, and/or the like. The action generator 316 can implement a tool and/or task by rendering graphics data and/or triggering an application to implement the tool and/or task. In some implementations, the action generator 316 and/or the distribution analyzer 310 can implement just-in-time intervention (JITI) by adjusting a frequency of recommendations sent to a user (e.g., a nudge frequency) based on the readiness level(s) indicated by the concatenated data.

In some instances, the action generator 316 can retrieve action data from a database (e.g., that is functionally and/or structurally similar to the database 130 of FIG. 1). For example, in response to the distribution analyzer 310 indicating to the action generator 316 that a user should be provided with content suitable for a given domain and readiness level, the action generator 316 can retrieve (e.g., based on a lookup table and/or a vector search) content associated with that domain and readiness level. Alternatively or in addition, the action generator 316 can be configured to generate an application programming interface (API) call to an application (e.g., that is different from and/or external to the recommendation application 312) to cause that application to implement the action. Such an application can include, for example, a cognitive game application, an application that implements a GUI for a journalling space, an application associated with cognitive behavior therapy, and/or the like. In some implementations, the action generator 316 can include a generative model (e.g., an LLM, machine learning model (such as a generative adversarial network (GAN)) configured generate image and/or video data, and/or the like). An indication of an action generated by the distribution analyzer 310 can be provided as input to a context window of the generative model, such that the action generator 316 generates data (e.g., data that describes the recommendation) that can be conveyed to the user. Alternatively or in addition, the action generator 316 can include an encoder model that receives from the distribution analyzer 310 a desired objective and/or goal of an action. In response, the encoder model can produce a semantic vector that can be used to perform a vector search within a database to retrieve relevant content.

The action adjuster 314 can be configured to modify an action determined by the distribution analyzer 310. For example, the action adjuster 314 can determine and/or receive as input a characteristic of the user and modify the determined action based on the characteristic. A characteristic can include, for example, a negativity bias metric and/or a locus of control metric. A negativity bias metric can indicate whether a user has a preference and/or a propensity to attend to, learn from, and/or use negative information rather than positive information, positive information rather than negative information, both positive and negative information, etc. For example, the recommendation application 312 can include an LLM that can generate positive and negative phrases, and the recommendation application 312 can evaluate a user's response (e.g., the tone of the response) to those phrases to determine the negative bias metric. If a user has a stronger preference for negative information, the action adjuster 314 can cause the action generator 316 to implement an action with harsher and/or more direct phrasing, tone, etc. Alternatively, if a user has a stronger preference for positive information, the action adjuster 314 can cause the action generator 316 to implement an action with softer and/or less direct phrasing, tone, etc.

While not shown in FIG. 3, in some alternative implementations, the distribution analyzer 310 can receive the negativity bias metric and/or the locus of control metric as input to determine the recommendation, such that generated recommendations and/or actions are conditioned on the negativity bias metric and/or the locus of control metric. As a result, the distribution analyzer 310 can be configured to receive both sequenced probability data and metric data. In some implementations, the distribution analyzer 310 can be configured to determine a trajectory of metric data (e.g., negativity bias metric data and/or the locus of control metric data) over time.

A locus of control metric can indicate how strongly a user believes they have control over a situation and/or experience that affects the user's life. In some implementations, the recommendation application 312 can be configured to infer the locus of control metric based on user responses to a questionnaire, such as the Rotter's Internal-External (I-E) Locus of Control Scale. The action adjuster 314 can cause the action generator 316 to emphasize internal (as to the user) factors over external factors (or vice versa) based on the locus of control metric.

The anomaly detector 318 can be configured to cause a probability distribution (and/or the associated input data) to be sent for manual review (e.g., at a compute device for display) if the distribution analyzer 310 does not recognize (e.g., based on prior training) the probability distribution. For example, the probability distribution may lack a local peak associated with a state (e.g., readiness state). In some instances, the distribution analyzer 310 can indicate a low confidence for a readiness state(s) that the distribution analyzer 310 assigns to a domain(s), causing the anomaly detector 318 to send the probability distribution (and/or the associated input data) for manual review. A supervisor can provide (e.g., via a GUI that is functionally and/or structurally similar to the user interface 122 of FIG. 1) a confirmation or rejection of the assigned readiness state, which can cause the distribution analyzer 310 to be retrained (e.g., cause a weight of the distribution analyzer 310 to be modified) and/or re-prompted. Alternatively or in addition, in response to the anomaly detector 318 detecting a low confidence score, the anomaly detector 318 can elicit further input data from the user (e.g., by generating question questions via an LLM) until sufficient data exists to determine the readiness state(s) above a threshold confidence.

To summarize the recommendation components 300 in use, the input data source(s) 302 can store input data that represent statements provided (e.g., uttered, typed, acted out, etc.) by a user. The statements can indicate that the user has a health condition (e.g., a first domain) and/or is exhibiting a symptom (e.g., a second domain that is attributable to the first domain). The domain classifier 304 can receive the input to identify the domain(s). The readiness distribution generator 306 can produce a probability value for each readiness level from a sequence of readiness values, resulting in a probability distribution. In some instances, the readiness distribution generator 306 can generate a probability distribution for each domain. Alternatively or in addition, the readiness distribution generator 306 can generate a probability distribution for a plurality of domains (e.g., such that the probability distribution is a multimodal distribution). The distribution analyzer 310 can designate a readiness level for at least one domain based on the probability distribution(s) and can further identify an action based on that readiness level and at least one domain. To illustrate the above, several example user-provided statements are described below. For each example user-provided statement, an example readiness level and an action, each inferred by the distribution analyzer 310 based on the given example user-provided statement, are also described.

In a first example, a user can indicate (as reflected by the input data) that they are not considering changing an aspect of the user's condition (e.g., a health problem). The user can further indicate that they are in denial of and/or resistant to addressing the condition. The user can also indicate that they do not consider the condition to be serious. The input data can also include data not directly provided by the user, such as clinical record data that indicates the user tried unsuccessfully to change the condition in the past and has since given up. Based on this input data, the domain classifier 304 can identify the user's condition (e.g., the health problem) as the domain. The distribution analyzer 310 can determine that the user has a "precontemplation" readiness level for the domain, which can be the first readiness level from a sequence of readiness levels. The distribution analyzer 310 can further identify an action to address the condition and that is appropriate for the determined readiness level. The action can include education on risks, benefits, and/or outcomes of change associated with the condition. The distribution analyzer 310 can provide an indication of the action to the action generator 316, such that the action generator 316 can retrieve, from a database, content (e.g., a digital brochure, an article, etc.) that provides the education. The action generator 316 can further cause the content to be conveyed to the user.

In a second example, a user can express (as indicated by the input data) that the user is ambivalent about changing their condition. More specifically, the user can contemplate (e.g., without resolution) costs versus benefits, barriers, etc. (e.g., with respect to time, expense, bother, fear, etc.). The distribution analyzer 310 can determine that the user has a "contemplation" readiness level, which can be after the "precontemplation" readiness level within the sequence of readiness levels. The distribution analyzer 310 can further determine that an appropriate action should identify barriers and/or misconceptions, address concerns, identify support systems, etc.

In a third example, a user can express (as indicated by the input data) that they are prepared to try and/or experiment with small changes to address their condition. The distribution analyzer 310 can determine that the user has a "preparation" readiness level, which can be after both the "precontemplation" readiness level and the "contemplation" readiness level within the sequence of readiness levels. The distribution analyzer 310 can further determine that an appropriate action should develop realistic goals and/or a timeline for change, provide positive reinforcement, etc.

In a fourth example, a user can express (as indicated by the input data) that they would like to take definitive action to change their behavior. The distribution analyzer 310 can determine that the user has an "action" readiness level, which can be after the "precontemplation" readiness level, the "contemplation" readiness level, and the "preparation" readiness level, within the sequence of readiness levels. The distribution analyzer 310 can further determine that an appropriate action should provide positive reinforcement to encourage the user to follow through on changing their behavior. In some instances, the user can indicate an action in their input data to cause the distribution analyzer 310 to determine that the user has an "action" readiness level. For example, the user can provide as input, "I will journal once a day to work on my anxiety" to cause the distribution analyzer 310 to determine that the user has the action readiness level. The user's input can further cause the distribution analyzer 310 to generate a recommendation that facilitates the action indicated by the user input.

In a fifth example, a user can express (as indicated the input data) that they are striving to maintain a new (e.g., improved) behavior into the future (e.g., over a long term time period). The distribution analyzer 310 can determine that the user has a "maintenance and relapse prevention" readiness level, which can be after the "precontemplation" readiness level, the "contemplation" readiness level, the "preparation" readiness level, and the "action" readiness level, within the sequence of readiness levels. The distribution analyzer 310 can further determine that an appropriate action should provide encouragement and support to help the user maintain their beneficial behavior.

In some instances, a user can initially have a higher readiness level and can subsequently revert to have a lower readiness level. For example, a user can find themselves outside of their comfort zone when introduced to a generated recommendation. Thus, while the sequence of readiness levels can define ordinal classification, a user readiness level can traverse this sequence in a nonlinear manner. For example, a user can have a readiness level of "maintenance" for a condition and can then indicate (e.g., through the user input data) that the user's condition has regressed. More specifically, the user can indicate that they have reduced confidence in maintaining the improved state of their condition, causing the distribution analyzer 310 to reclassify the user in an "action" or "contemplation" state. Alternatively or in addition, a user can have a readiness level of "precontemplation" and can then indicate they have sufficient knowledge of materials that the action generator 316 would suggest at the "contemplation" stage, causing the distribution analyzer 310 to skip the contemplation readiness level and classify the user as having the preparation readiness level.

In some implementations, the distribution analyzer 310 can determine that a user has progressed to a different (e.g., next) readiness level if the user has completed a task (e.g., an action generated or facilitated by the action generator 316) and the user's language and/or behavior (e.g., as indicated by the user input data) indicates that the user is ready to progress (e.g., rather than revisit a previous task). For example, in response to a user indicating, "I'm ready to work on my anxiety," the distribution analyzer 310 can determine that the user has a preparation readiness level. After the user indicates, "I will journal once a day to work on my anxiety," the distribution analyzer 310 can then indicate that the user has an action readiness level. The action generator 316 can then generate action data (e.g., a journal template) to facilitate journaling for anxiety.

Figure 4:
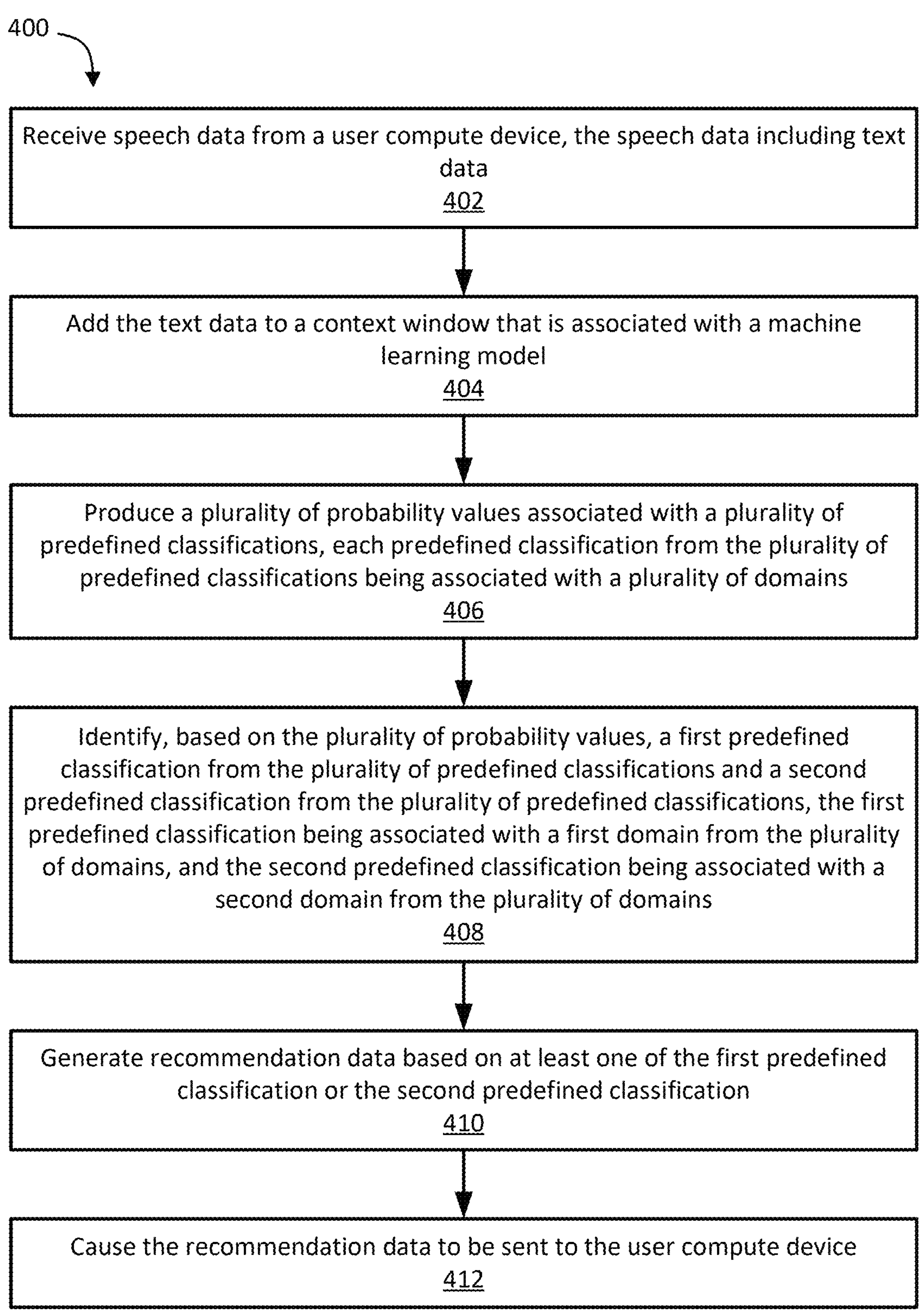
FIG. 4 shows a flow diagram illustrating a method implemented by a recommendation application to generate recommendation data, according to an embodiment.

FIG. 4 shows a flow diagram illustrating a method implemented by a recommendation application to generate recommendation data, according to an embodiment. The method 400 can be implemented by a recommendation system described herein (e.g., the recommendation system 100 of FIG. 1). Portions of the method 400 can be implemented using a processor (e.g., the processor 220 of FIG. 2) of any suitable compute device (e.g., the compute device 201 of FIG. 2 and/or the compute devices 110 and/or 120 of FIG. 1).

The method 400 at 402 includes receiving speech data from a user compute device, the speech data including text data. At 404, the text data is added to a context window that is associated with a machine learning model to produce, at 406, a plurality of probability values associated with a plurality of predefined classifications, each predefined classification from the plurality of predefined classifications being associated with a plurality of domains. Based on the plurality of probability values, at 408, a first predefined classification is identified from the plurality of predefined classifications and a second predefined classification is identified from the plurality of predefined classifications, the first predefined classification being associated with a first domain from the plurality of domains, and the second predefined classification being associated with a second domain from the plurality of domains. The method 400 at 410 includes generating recommendation data based on at least one of the first predefined classification or the second predefined classification, and the recommendation data is sent to the user compute device at 412.

Figure 5:
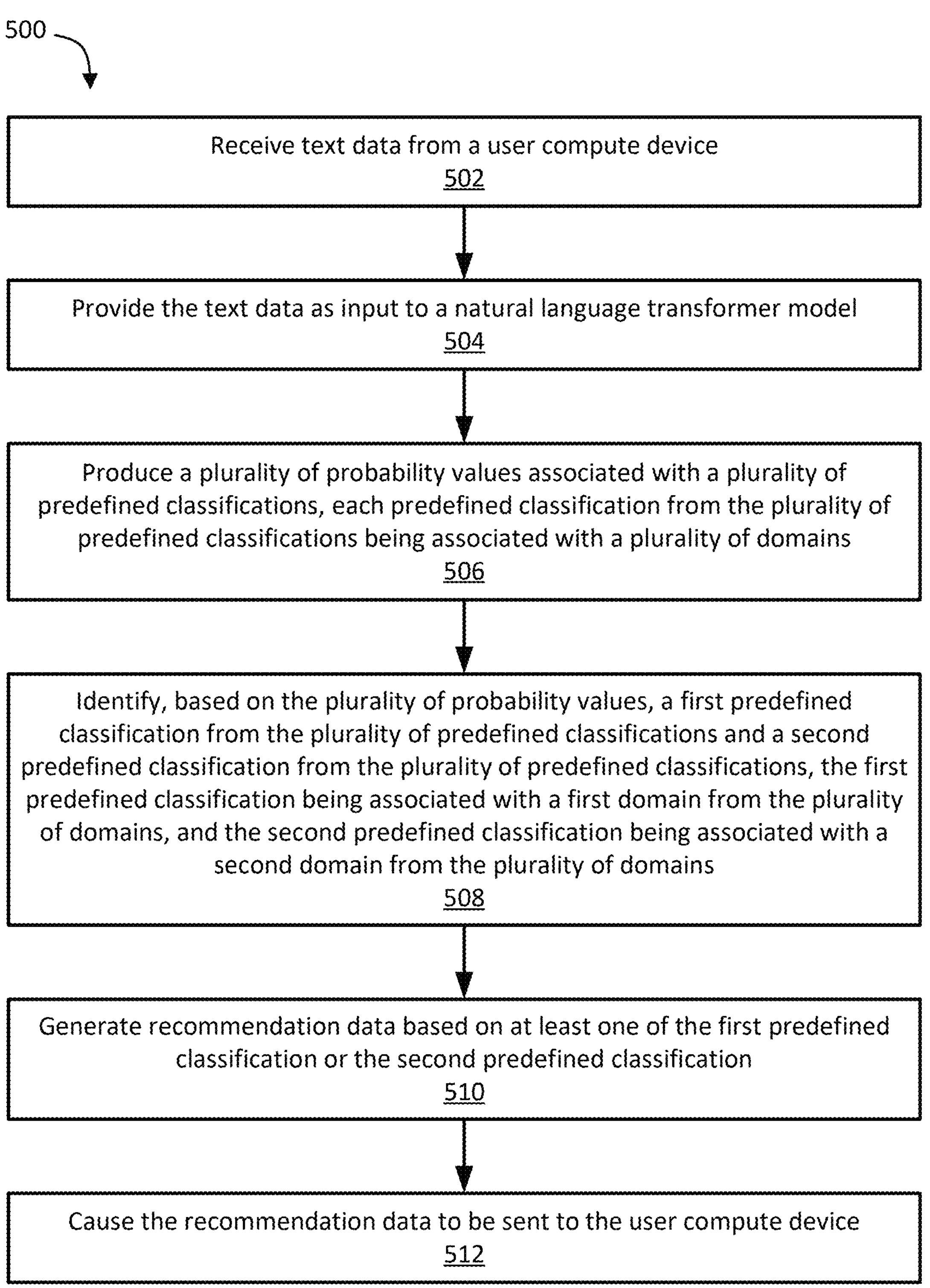
FIG. 5 shows a flow diagram illustrating a method implemented by a recommendation application to produce a plurality of probability values associated with a plurality of predefined classifications, according to an embodiment.

FIG. 5 shows a flow diagram illustrating a method implemented by a recommendation application to produce a plurality of probability values associated with a plurality of predefined classifications, according to an embodiment. The method 500 can be implemented by a recommendation system described herein (e.g., the recommendation system 100 of FIG. 1). Portions of the method 500 can be implemented using a processor (e.g., the processor 220 of FIG. 2) of any suitable compute device (e.g., the compute device 201 of FIG. 2 and/or the compute devices 110 and/or 120 of FIG. 1).

The method 500 at 502 includes receiving text data from a user compute device. The text data is provided as input to a natural language transformer model at 504, and a plurality of probability values associated with a plurality of predefined classifications is produced at 506, each predefined classification from the plurality of predefined classifications being associated with a plurality of domains. The method 500 at 508 includes identifying, based on the plurality of probability values, a first predefined classification from the plurality of predefined classifications and a second predefined classification from the plurality of predefined classifications, the first predefined classification being associated with a first domain from the plurality of domains, and the second predefined classification being associated with a second domain from the plurality of domains. Recommendation data is generated at 510 based on at least one of the first predefined classification or the second predefined classification, and at 512, the recommendation data is caused to be sent to the user compute device.

Figure 6:
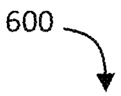
FIG. 6 shows a flow diagram illustrating a method implemented by a recommendation application to train a machine learning model to predict a classification from a plurality of classifications that defines a sequence, according to an embodiment.
Figure 6:
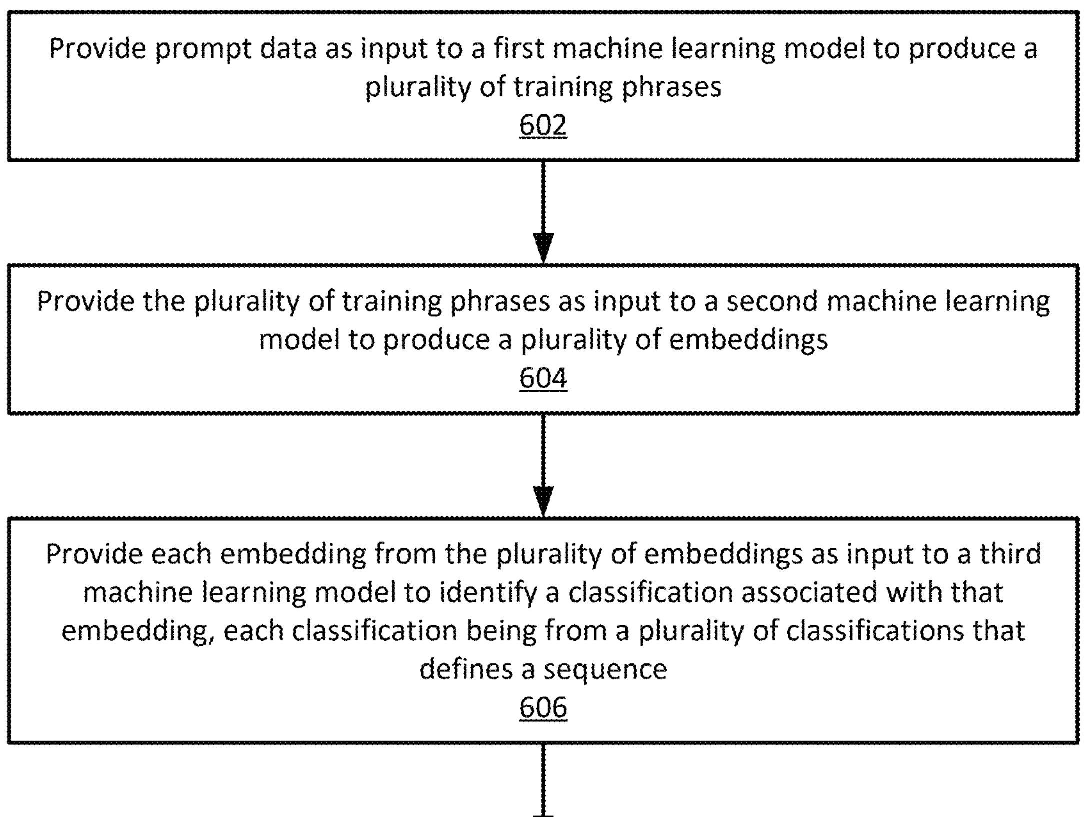

FIG. 6 shows a flow diagram illustrating a method implemented by a recommendation application to train a machine learning model to predict a classification from a plurality of classifications that defines a sequence, according to an embodiment. The method 600 can be implemented by a recommendation system described herein (e.g., the recommendation system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 of FIG. 1).

The method 600 at 602 includes providing prompt data as input to a first machine learning model to produce a plurality of training phrases. At 604, the plurality of training phrases is provided as input to a second machine learning model to produce a plurality of embeddings. The method 600 at 606 includes providing each embedding from the plurality of embeddings as input to a third machine learning model to identify a classification associated with that embedding, each classification being from a plurality of classifications that defines a sequence. A fourth machine learning model is trained at 608 to predict, based on text data received from a user compute device, the classification from the plurality of classifications.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:

receive speech data from a user compute device, the speech data including text data;

add the text data to a context window that is associated with a machine learning model to:

produce a plurality of probability values that defines a plurality of local peaks that is associated with a plurality of milestones, each milestone from the plurality of milestones having an order within the plurality of milestones, identify, based on a distribution of the plurality of probability values, (1) a first predefined classification associated with (i) a first milestone from the plurality of milestones and (ii) a first local peak from the plurality of local peaks, and (2) a second predefined classification associated with (i) a second milestone from the plurality of milestones and (ii) a second local peak from the plurality of local peaks, and generate recommendation data based on the first predefined classification and the second predefined classification; and cause the recommendation data to be sent to the user compute device.

2. The non-transitory, processor-readable medium of claim 1, wherein the machine learning model includes a natural language transformer model.

3. The non-transitory, processor-readable medium of claim 1, wherein the instructions to cause the processor to cause the recommendation data to be sent to the user compute device include instructions to cause audio data that represents the recommendation data to be sent to the user compute device to cause a speaker that is operably coupled to the user compute device to audibly convey the audio data to a user associated with the user compute device.

4. The non-transitory, processor-readable medium of claim 1, wherein:

the instructions to cause the processor to identify the first predefined classification and the second predefined classification include instructions to cause the processor to:

concatenate the plurality of probability values to produce a probability vector, and provide the probability vector as input to a Dirichlet mixture model (DMM) to:

identify the first predefined classification associated with a first domain, and identify the second predefined classification associated with a second domain different from the first domain.

5. The non-transitory, processor-readable medium of claim 1, wherein:

the context window includes historical text data received from the user compute device; and the plurality of probability values is produced based on the text data and the historical text data.

6. The non-transitory, processor-readable medium of claim 1, wherein:

the first predefined classification indicates a first level of readiness associated with a first domain;

the second predefined classification indicates a second level of readiness associated with a second domain; and the recommendation data indicates an intervention associated with the first level of readiness and the second level of readiness.

7. The non-transitory, processor-readable medium of claim 1, further storing instructions to cause the processor to:

receive intervention history data; and provide the intervention history data as further input to the machine learning model to produce the plurality of probability values.

8. The non-transitory, processor-readable medium of claim 1, wherein the text data is first text data, and the recommendation data is first recommendation data, the non-transitory, processor-readable medium further storing instructions to cause the processor to:

in response to causing the first recommendation data to be sent to the user compute device, receive feedback data from the user compute device;

provide the feedback data to the machine learning model to modify a weight of the machine learning model;

receive second text data from the user compute device; and provide the second text data as input to the machine learning model to produce second recommendation data.

9. A method, comprising:

receiving text data from a user compute device;

providing the text data as input to a natural language transformer model to:

produce a plurality of probability values that defines a plurality of local peaks that is associated with a plurality of milestones, each milestone from the plurality of milestones having an order within the plurality of milestones, identify, based on a distribution of the plurality of probability values, (1) a first predefined classification associated with (i) a first milestone from the plurality of milestones and (ii) a first local peak from the plurality of local peaks, and (2) a second predefined classification associated with (i) a second milestone from the plurality of milestones and (ii) a second local peak from the plurality of local peaks, and generate recommendation data based on the first predefined classification and the second predefined classification; and causing the recommendation data to be sent to the user compute device.

10. The method of claim 9, wherein:

the plurality of milestones represents a plurality of readiness levels;

the first predefined classification represents a first readiness level from the plurality of readiness levels, the first predefined classification being identified based on a first initial readiness level; and the second predefined classification represents a second readiness level from the plurality of readiness levels, the second predefined classification being identified based on a second initial readiness level.

11. The method of claim 9, wherein:

the first predefined classification indicates a level of readiness associated with a first domain;

the second predefined classification indicates a level of readiness associated with a second domain; and the recommendation data indicates an intervention associated with the level of readiness associated with the first domain and the level of readiness associated with the second domain.

12. The method of claim 11, wherein at least one of the level of readiness associated with the first domain or the level of readiness associated with the second domain includes at least one of a precontemplation level of readiness, a contemplation level of readiness, a preparation level of readiness, an action level of readiness, or a maintenance level of readiness.

13. The method of claim 11, wherein the first domain and the second domain are included in a hierarchy of domains.

14. The method of claim 9, wherein the text data is first text data, and the recommendation data is first recommendation data, the method further comprising:

in response to causing the first recommendation data to be sent to the user compute device, receiving feedback data from the user compute device;

providing the feedback data to the natural language transformer model to modify a weight of the natural language transformer model;

receiving second text data from the user compute device; and providing the second text data as input to the natural language transformer model to produce second recommendation data.

15. An apparatus, comprising:

a processor; and a memory operably coupled to the processor and storing instructions to cause the processor to:

receive text data from a user compute device, provide the text data as input to a natural language transformer model to:

produce a plurality of probability values that defines a plurality of local peaks that is associated with a plurality of milestones, each milestone from the plurality of milestones having an order within the plurality of milestones, identify, based on a distribution of the plurality of probability values, (1) a first predefined classification associated with (i) a first milestone from the plurality of milestones and (ii) a first local peak from the plurality of local peaks, and (2) a second predefined classification associated with (i) a second milestone from the plurality of milestones and (ii) a second local peak from the plurality of local peaks, and generate recommendation data based on the first predefined classification and the second predefined classification, and cause the recommendation data to be sent to the user compute device.

16. The apparatus of claim 15, wherein:

the plurality of milestones represents a plurality of readiness levels;

the first predefined classification represents a first readiness level from the plurality of readiness levels, the first predefined classification being identified based on a first initial readiness level; and the second predefined classification represents a second readiness level from the plurality of readiness levels, the second predefined classification being identified based on a second initial readiness level.

17. The apparatus of claim 15, wherein:

the first predefined classification indicates a level of readiness associated with a first domain;

the second predefined classification indicates a level of readiness associated with a second domain; and the recommendation data indicates an intervention associated with at least one of the level of readiness associated with the first domain and the level of readiness associated with the second domain.

18. The apparatus of claim 17, wherein at least one of the level of readiness associated with the first domain or the level of readiness associated with the second domain includes at least one of a precontemplation level of readiness, a contemplation level of readiness, a preparation level of readiness, an action level of readiness, or a maintenance level of readiness.

19. The apparatus of claim 17, wherein the first domain and the second domain are included in a hierarchy of domains.

20. The apparatus of claim 15, wherein the text data is first text data, and the recommendation data is first recommendation data, the memory further storing instructions to cause the processor to:

in response to causing the first recommendation data to be sent to the user compute device, receive feedback data from the user compute device;

provide the feedback data to the natural language transformer model to modify a weight of the natural language transformer model;

receive second text data from the user compute device; and provide the second text data as input to the natural language transformer model to produce second recommendation data.

* * * * *